UNITED STATES PATENT OFFICE.

VICTOR E. STARNER, OF CHICAGO, ILLINOIS.

PROCESS OF REFINISHING PAINTED, VARNISHED, OR FILLED SURFACES.

1,240,616. Specification of Letters Patent. Patented Sept. 18, 1917.

No Drawing. Application filed September 25, 1916. Serial No. 122,152.

*To all whom it may concern:*

Be it known that I, VICTOR E. STARNER, a citizen of the United States, residing in the city of Chicago, in the county of Cook and State of Illinois, have invented new and useful Improvements in the Processes of Refinishing Painted, Varnished, or Filled Surfaces, of which the following is a specification.

This invention relates to a process of refinishing painted, varnished or filled surfaces. Heretofore attempts have been made to refinish a painted, varnished or filled surface by applying thereto enamels of various sorts, but difficulty has been encountered in making the enamel adhere to the original surface. This difficulty was caused partly by the action of the enamel upon the old paint, varnish or filler, and was especially noticeable when the enamel being used was a celluloid enamel. The solvent of an enamel with a celluloid or cellulose base acts on the old paint, varnish or filler and softens it, making a mixture which wrinkles up and comes off.

In order to overcome the difficulties heretofore experienced, and to provide a method or process for refinishing such painted, varnished or filled surfaces as automobile bodies, railway coaches and the like, and especially to provide a method or process for applying to such surfaces an enamel with a celluloid cellulose base, I have devised the hereinafter described process of preparing such an enamel and applying it to such surfaces. In accordance with my improved process, an enamel is made of a celluloid or cellulose base dissolved in amylacetate or ethylacetate, or a product of fusel oil, or other suitable solvent. The celluloid or cellulose base is made by first treating cotton with sulfuric and nitric acids, the resulting product being nitrated cotton. This nitrated cotton is then dissolved in a suitable solvent such as amylacetate or ethylacetate, or a by-product of fusel oil, with the addition of camphor and a coloring matter if desired, making a celluloid enamel. A celluloid enamel can also be made by dissolving celluloid in the same solvents, but the process above described is simpler and cheaper.

In applying the celluloid enamel above described to a painted, varnished, or filled surface, there is first applied to the old surface a covering of shellac, which may consist of one or more coats. There should be a thorough covering of the shellac. If the shellac is thin, it is advisable to use more than one coat in order to procure a good covering. This can be placed on an old painted, varnished, or filled surface without loosening the old paint, varnish, or filler, as the alcohol in the shellac does not act on the latter, and the shellac dries very quickly. Upon the surface thus protected by the coating of shellac is then spread a coat of celluloid enamel made in the manner above described, which eats into the dry shellac slightly and sufficiently to make the enamel adhere firmly, but does not dissolve or soften the shellac. The enamel also dries very quickly and this completes the refinishing process and leaves a surface which is smooth and water-proof, forming a protective covering over the old paint, varnish, or filler, and capable of taking a very high finish. Thus is provided a means for readily and economically refinishing a painted, varnished, or filled surface which has become dingy or dull without the necessity of removing any of the old paint, varnish, or filler, and the process is especially valuable in refinishing such surfaces as automobile bodies, carriages, railway coaches and other places where originally much time and work is put into preparing highly finished surfaces and it is afterward desired to restore these to their original appearance after they have become dingy and dull.

I claim:

1. The process of refinishing a painted or varnished surface, or a surface having a superficial coating of filler, which consists in covering such surface with a substance not readily acted on by an enamel with a celluloid or cellulose base, and then applying over such substance such an enamel.

2. The process of refinishing a painted or varnished surface, or a surface with a superficial coating of filler, which consists in first covering such surface with a substance not readily dissolved by the solvent of an enamel made of a celluloid or cellulose base, and then applying over such substance such an enamel.

3. The process of refinishing a painted or varnished surface, or a surface having a superficial coating of filler, which consists in applying over such old paint or varnish or superficial coating of filler, a covering of shellac, and then applying over it an enamel with a celluloid or cellulose base.

4. The process of refinishing a painted or varnished surface, or a surface having a superficial coating of filler, which consists in applying over the old paint or varnish or superficial coating of filler, a covering of shellac, and then applying over it an enamel of a celluloid or cellulose base dissolved in a suitable solvent.

In witness whereof, I have hereunto subscribed my name this 23d day of September, 1916.

V. E. STARNER.